(12) United States Patent
Mueller

(10) Patent No.: US 12,055,465 B2
(45) Date of Patent: Aug. 6, 2024

(54) LOW PRESSURE CRYOGENIC FLUID SAMPLING SYSTEM

(71) Applicant: Siegfried Georg Mueller, Newton, NJ (US)

(72) Inventor: Siegfried Georg Mueller, Newton, NJ (US)

(*) Notice: Subject to any disclaimer, the term of this patent is extended or adjusted under 35 U.S.C. 154(b) by 162 days.

(21) Appl. No.: 17/646,400

(22) Filed: Dec. 29, 2021

(65) Prior Publication Data

US 2022/0205877 A1 Jun. 30, 2022

Related U.S. Application Data

(60) Provisional application No. 63/199,440, filed on Dec. 29, 2020.

(51) Int. Cl.
| | | |
|---|---|---|
| *G01N 1/20* | (2006.01) | |
| *F17C 13/02* | (2006.01) | |
| *G01N 1/10* | (2006.01) | |

(52) U.S. Cl.
CPC ............ *G01N 1/2035* (2013.01); *F17C 13/02* (2013.01); *F17C 2223/0161* (2013.01); *G01N 2001/1037* (2013.01); *G01N 2001/205* (2013.01); *G01N 2001/2064* (2013.01); *G01N 2001/2071* (2013.01)

(58) Field of Classification Search
CPC ......... G01N 1/2035; G01N 2001/1037; G01N 2001/205; G01N 2001/2064; G01N 2001/2071; G01N 1/44; G01N 1/10; F17C 13/02; F17C 2223/0161
USPC ............ 73/863.11, 863.41, 863.81, 863.85, 73/863.86, 864, 864.51, 864.63, 864.91; 141/4, 5, 11, 382; 222/146.6; 220/560.04–560.15; 505/842; 137/334, 137/625, 883

See application file for complete search history.

(56) References Cited

U.S. PATENT DOCUMENTS

| | | | | |
|---|---|---|---|---|
| 3,123,982 | A | * | 3/1964 | Brown et al. ........... F17C 13/02 |
| | | | | 73/864.91 |
| 3,633,372 | A | | 1/1972 | Kimmel et al. |

(Continued)

FOREIGN PATENT DOCUMENTS

EP 3699477 A1 * 8/2020 ............... F16L 27/12

*Primary Examiner* — Robert R Raevis
(74) *Attorney, Agent, or Firm* — Dunlap Bennett & Ludwig, PLLC; Anna L. Kinney

(57) ABSTRACT

A low-pressure cryogenic fluid sampling system includes a cryogenic sample handle assembly; a transfer and vaporization tubular loop; and a sample vessel. The sample handle assembly connects to a cryogenic storage vessel containing a cryogenic fluid. The tubular loop connects to the cryogenic sample handle assembly. The sample vessel removably connects to the transfer and vaporization tubular loop and accommodates a gaseous sample having a pressure lower than about 200 kPa. A method of collecting a gaseous sample with the sampling system includes purging the sample vessel; actuating the handle to purge and refrigerate the tubular loop; extracting a volume of a cryogenic fluid from the storage vessel into the loop to vaporize the cryogenic fluid and produce a gaseous sample; and transferring the sample from the tubular loop into the sample vessel. The sampling system is safer, maintains stoichiometric quantities in the cryogenic liquid, and reduces cross contamination.

8 Claims, 2 Drawing Sheets

(56) References Cited

U.S. PATENT DOCUMENTS

| | | | |
|---|---|---|---|
| 4,283,948 | A | 8/1981 | Longsworth |
| 4,561,258 | A | 12/1985 | Brodbeck et al. |
| 4,592,205 | A | 6/1986 | Brodbeck et al. |
| 4,674,289 | A | 6/1987 | Andonian |
| 5,161,381 | A | 11/1992 | Victor et al. |
| 5,255,523 | A | 10/1993 | Burgers et al. |
| 5,452,582 | A | 9/1995 | Longsworth |
| 5,488,831 | A | 2/1996 | Griswold |
| 6,035,646 | A | 3/2000 | Griswold |
| 7,413,585 | B2 | 8/2008 | Da Silva et al. |
| 7,546,744 | B2 | 6/2009 | Harper et al. |
| 8,726,676 | B2 | 5/2014 | Watts et al. |
| 2006/0218941 | A1 | 10/2006 | Drube |
| 2018/0112824 | A1 | 4/2018 | Gaddis et al. |
| 2021/0063285 | A1* | 3/2021 | Thompson ............... G01N 1/14 |

* cited by examiner

LOW PRESSURE CRYOGENIC FLUID SAMPLING SYSTEM

CROSS-REFERENCE TO RELATED APPLICATION

This application claims the benefit of priority of U.S. provisional application No. 63/199,440, filed Dec. 29, 2020, the contents of which are herein incorporated by reference.

BACKGROUND OF THE INVENTION

The present invention relates to a sampling system for cryogenic fluid and, more particularly, to a system that provides a low-pressure gaseous sample.

Liquid cryogen sampling is dangerous due to exposure to cold temperatures and to the presence of high-pressure gas from pressurized gas cylinders as the cryogen converts to high pressure gas in sampling vessels. In addition, maintaining stoichiometric quantities of analytes from the sampled liquid having different boiling point temperatures is difficult using existing systems.

Currently available systems were not designed to directly vaporize a cryogenic liquid to a low-pressure gas. Commercially available sampling devices expose the user to uncontrolled cryogenic fluid during cooling phases. The sample is maintained at a hazardous high pressure. Moreover, the existing sampling devices are inadequate because the annular space within the high-pressure vessel contributes to cross contamination of the vaporized sample and because the vaporized sample heavily partitions, disturbing the stoichiometric distribution of analytes. The existing systems are difficult to decontaminate due to the construction of the sampling vessel.

As can be seen, there is a need for a cryogenic liquid sampling system that is safer, that maintains stoichiometric quantities in the cryogenic liquid, and that reduces cross contamination.

SUMMARY OF THE INVENTION

In one aspect of the present invention, a low-pressure cryogenic fluid sampling system is provided, comprising: a cryogenic sample handle assembly configured to couple with a cryogenic storage vessel containing a cryogenic fluid; a transfer and vaporization tubular loop in fluid communication with the cryogenic sample handle assembly; and a sample vessel removably connected to and in fluid communication with the transfer and vaporization tubular loop and configured to accommodate a gaseous sample having a pressure lower than about 200 kPa.

In another aspect of the present invention, a method of collecting a gaseous sample from a cryogenic fluid system is provided, comprising: providing a cryogenic storage vessel and a low-pressure cryogenic fluid sampling system comprising a cryogenic sample handle assembly; a transfer and vaporization tubular loop; and a sample vessel; purging the sample vessel through an outlet vent valve; actuating the cryogenic sample handle assembly to purge and refrigerate the transfer and vaporization tubular loop; extracting a volume of a cryogenic fluid from the cryogenic storage vessel into the transfer and vaporization loop at a predetermined velocity operative to vaporize the cryogenic fluid, producing a cryogenic gaseous sample; and transferring the cryogenic gaseous sample from the transfer and vaporization loop into the sample vessel at a pressure lower than about 200 kPa.

These and other features, aspects and advantages of the present invention will become better understood with reference to the following drawings, description, and claims.

DETAILED DESCRIPTION OF THE INVENTION

Figure 1:
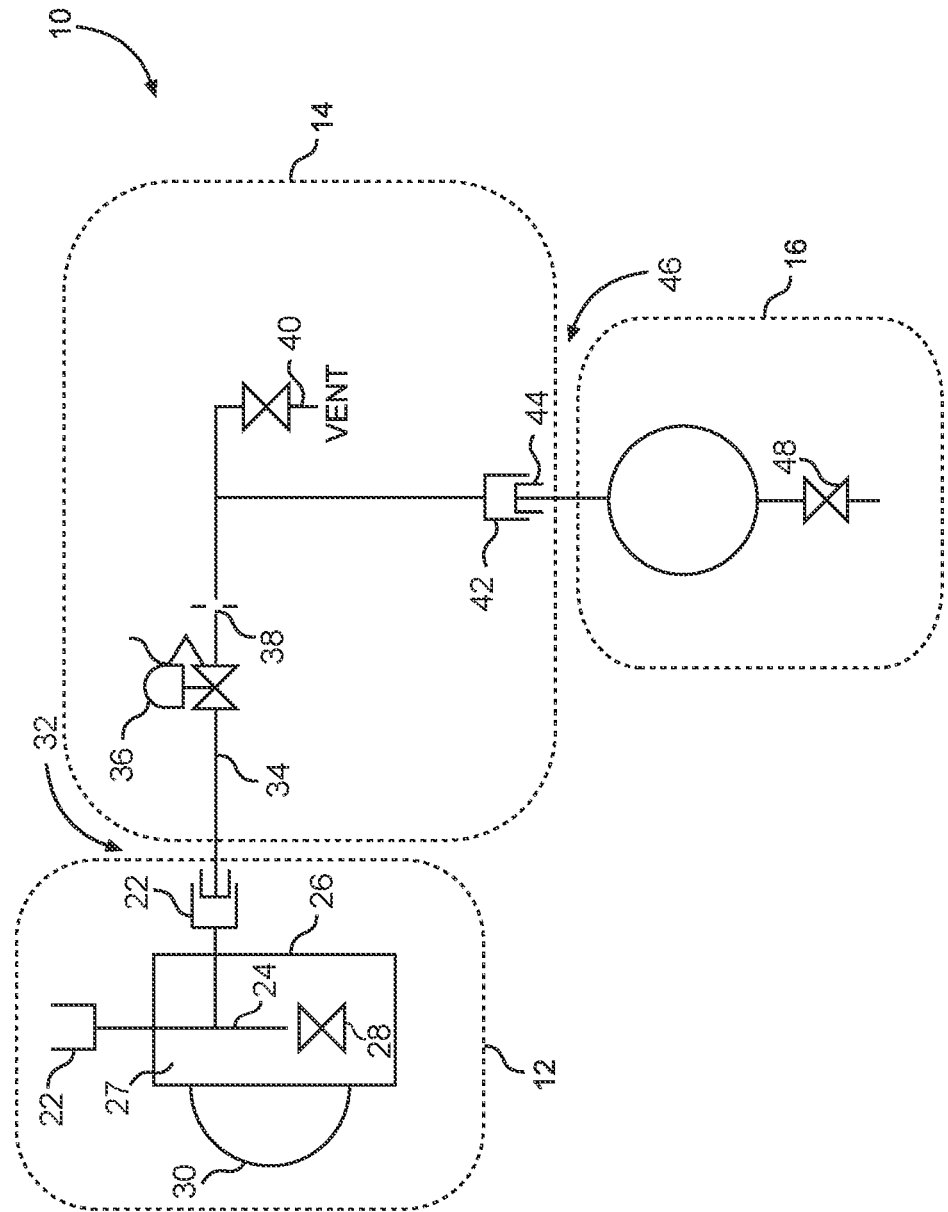
FIG. 1 is a top plan view of a cryogenic sampler according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a low-pressure cryogenic fluid sampling system comprising a cryogenic sample handle, a transfer and vaporization loop, and a low-pressure sample vessel.

The system comprises a series of valves and flow restricting devices to directly vaporize and capture the cryogenic liquid as a low-pressure gas. The cryogenic liquid is directed away from the operator, limiting exposure to the user. The system also comprises a low-pressure sample vessel operative to eliminate atmospheric contamination and to maintain stoichiometric quantities of analytes within a vaporized sample. The sample is maintained at a non-hazardous pressure. The inventive system may be easily decontaminated.

The inventive system does not require electricity input or any utilities to operate. The sampling system takes advantage of the kinetic energy of the fluid passing through ambient temperature valves and restrictors to provide a low-pressure gaseous sample representative of the original cryogenic fluid.

The cryogenic sample handle assembly may comprise an insulating handle, a bypass body with adaptive fluid transfer fittings and an interior cavity, and a taper-fit long-stemmed valve. The insulating handle attached to the body allows the user to hold the assembly. The interior cavity is operative to allow cryogenic fluid to pass through the center of the valve and vent safely away from the user. The cryogenic sample handle assembly generally interfaces with the cryogenic storage vessel and is operative to pull and safely vent the cryogenic fluid. The handle may open a bypass to purge and refrigerate the sample line. Upstream of the venting fluid, a small sample volume may be extracted into the transfer and vaporization loop.

Once the sample line has been refrigerated and purged, the cryogenic sample may leave the cryogenic sample handle and enter the transfer and vaporization loop. The length and diameter of the loop is selected to allow ambient heat to vaporize the fluid as it passes at a predetermined high velocity. Vaporized gas may be vented at a specific predetermined flow rate to maintain the velocity and heat leak in the transfer and vaporization loop.

The sample may be vaporized and rapidly transported to a sample bypass having a low dead volume connection for extraction into a low-pressure sample vessel. The sample vessel generally comprises an adaptive fitting inlet operative to couple with a corresponding fitting on the vaporization loop sample bypass. The fitting may be inserted into the vessel using compression and threaded fittings. The vessel may be purged via locking outlet vent valve, allowing quick depressurization and decontamination of the sample vessel. After a predetermined period, the low-pressure sample vessel may be inserted into the vaporized gas stream in the vaporization loop and allowed to fill. The sample filling the sample canisters is generally maintained at a pressure lower than about 200 kilopascal (kPa). Once filled, the vessel may be transported elsewhere for analysis.

The pressure may be controlled via pressure regulator, the outlet of which has a pressure restricting device. The restrictor and regulator assembly may reduce the pressure while adding energy as the sample passes through the restriction, further volatilizing the sample fluid.

In some embodiments, the placement of restrictors and/or regulators may be reconfigured to allow for similar functionality in a different orientation.

In some embodiments, the system may be used on non-cryogenic high-pressure gas sources without modification.

The materials, dimensions, and method of manufacture are not particularly limited. The valve handle assembly body and adaptive fittings may be manufactured from any suitable metal, such as stainless-steel, brass, aluminum, or any combination thereof. The insulating handle may be manufactured from any suitable plastic. The transfer and vaporization loop may have a tube manufactured from a high-pressure stainless-steel covered Teflon® fluoropolymer coating with a length consistent with the distance from the cryogenic handle to the vaporization loop. The stainless-steel covered Teflon® tube adapts to a measured length of coiled stainless-steel tubing before entering a pressure reducing regulator. The outlet of the pressure regulator and restrictor assembly may be plumbed, in stainless steel with ¼" outer diameter, to a bypass meter. The sample connection may have an interior dead volume of about 0.2 cubic centimeters (cc). The sample vessel may be manufactured from electropolished stainless steel, for example welded from two hemispheres. The vessel volume may be selected according to sampling need. For example, the sample vessel internal volume may be about 2.7 liters. The outlet vent valve may be manufactured from stainless-steel with compression outlet fittings, having ¼" outer diameters, and may be provided with protective caps.

Figure 2:
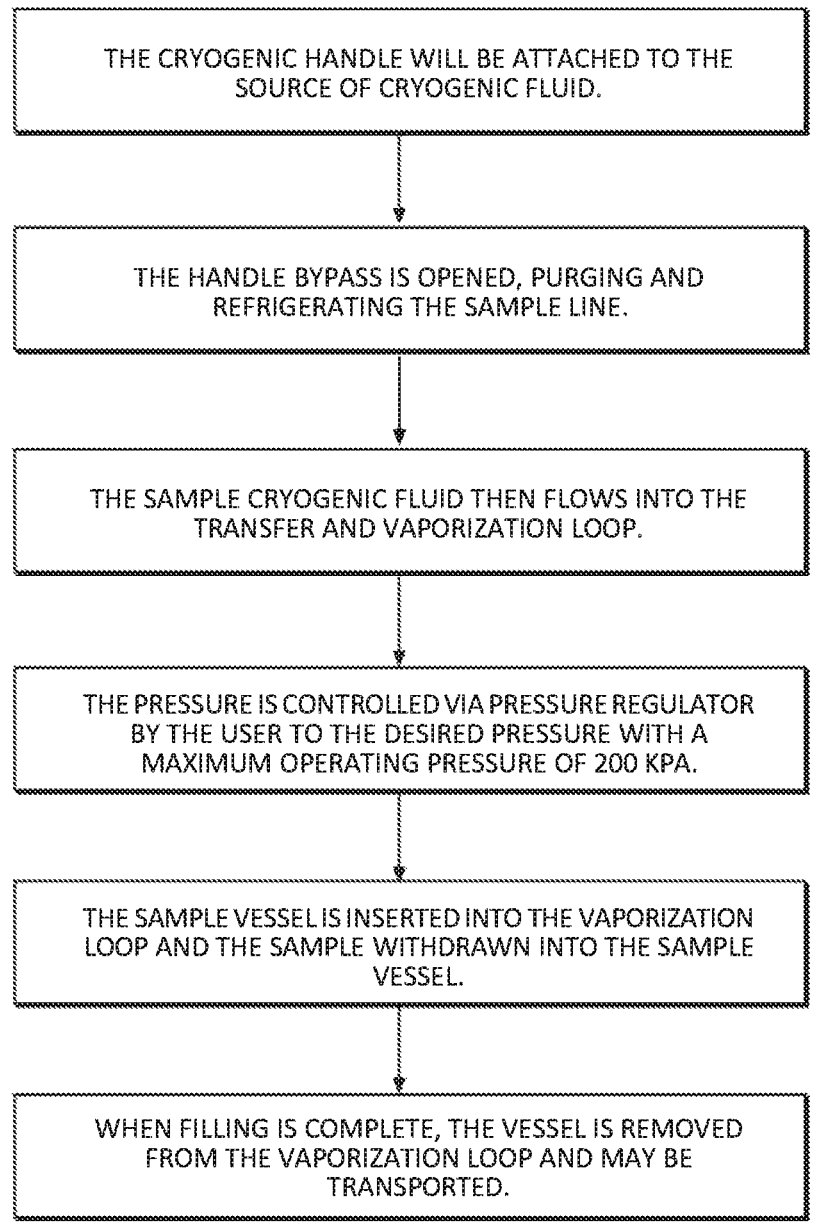
FIG. 2 is a flowchart of a process of cryogenic sampling according to an embodiment of the present invention.

Referring to FIGS. 1 and 2, FIG. 1 shows a cryogenic sampling system 10 comprising a cryogenic bypass handle 12 attached to a cryogenic fluid storage vessel (not shown), a transfer and vaporization loop 14, and a sample vessel 16. The cryogenic bypass handle 12 may be used to open a bypass allowing cryogenic fluid to enter the transfer and vaporization loop 14 after the transfer and vaporization loop 14 has been purged and refrigerated. The sample vessel 16 may be coupled to the transfer and vaporization loop 14 to withdraw a low-pressure sample of the cryogenic fluid. When the sample vessel 16 is filled, the vessel may be removed from the loop 14.

The cryogenic sample handle assembly 12 includes an insulating handle 30, a bypass body 26 with adaptive fluid transfer fittings 22 and an interior cavity 27, and a taper-fit long-stemmed 24 valve 28. The cryogenic sample is transferred 32 from the cryogenic sample handle assembly 12 to the transfer and vaporization loop 14 at line 34. The pressure is controlled via a pressure regulator 36, the outlet of which has a pressure restricting device 38. Vaporized gas may be vented at a transfer and vaporization loop vent 40. The vessel 16 may be purged via a locking outlet vent valve 48. The sample bypass has a low dead volume connection with an adaptive fitting inlet 44 operative to couple with a corresponding fitting 42 on the vaporization loop sample bypass 46.

FIG. 2 describes an exemplary method of using the sampling system.

It should be understood, of course, that the foregoing relates to exemplary embodiments of the invention and that modifications may be made without departing from the spirit and scope of the invention as set forth in the following claims.

What is claimed is:

1. A low-pressure cryogenic fluid sampling system, comprising:
    a cryogenic sample handle assembly configured to couple with a cryogenic storage vessel containing a cryogenic fluid;
    a transfer and vaporization tubular loop in fluid communication with the cryogenic sample handle assembly; and
    a sample vessel removably connected to and in fluid communication with the transfer and vaporization tubular loop and configured to accommodate a gaseous sample having a pressure lower than about 200 kPa;
    wherein said transfer and vaporization tubular loop is operative to vaporize a cryogenic sample to the gaseous sample prior to its entry into the sample vessel.

2. The low-pressure cryogenic fluid sampling system of claim 1, wherein the transfer and vaporization tubular loop further comprises at least one valve and at least one flow restricting device in series operative to directly vaporize and capture the cryogenic fluid as a gas having a pressure lower than about 200 kPa.

3. The low-pressure cryogenic fluid sampling system of claim 1, wherein the cryogenic sample handle assembly, transfer and vaporization tubular loop, and sample vessel operate without electricity input.

4. The low-pressure cryogenic fluid sampling system of claim 1, wherein the cryogenic sample handle assembly comprises:
    a body having an interior cavity operative to accommodate cryogenic fluid and adaptive fluid transfer fittings;
    an insulating handle attached to the bypass body; and
    a taper-fit long-stemmed valve.

5. The low-pressure cryogenic fluid sampling system of claim 1, wherein the transfer and vaporization tubular loop further comprises at least one pressure regulator having an inlet and an outlet, wherein the outlet comprises a pressure restricting device.

6. The low-pressure cryogenic fluid sampling system of claim 1, wherein the sample vessel further comprises an outlet vent valve.

7. A method of collecting a gaseous sample from a cryogenic fluid system, comprising:
    a) providing a cryogenic storage vessel and a low-pressure cryogenic fluid sampling system comprising a cryogenic sample handle assembly; a transfer and vaporization tubular loop in fluid communication with the cryogenic sample handle assembly; and a sample vessel in fluid communication with the transfer and vaporization tubular loop;
    b) purging the sample vessel through an outlet vent valve;
    c) actuating the cryogenic sample handle assembly to purge and refrigerate the transfer and vaporization tubular loop;
    d) extracting a volume of a cryogenic fluid from the cryogenic storage vessel into the transfer and vaporization tubular loop at a predetermined velocity operative to vaporize the cryogenic fluid, producing a cryogenic gaseous sample; and e) transferring the cryogenic gaseous sample from the transfer and vaporization tubular loop into the sample vessel at a pressure lower than about 200 kPa.

8. The method of collecting a gaseous sample from a cryogenic fluid system of claim 7, further comprising venting vaporized gas from the transfer and vaporization tubular loop at a predetermined flow rate to maintain a predetermined velocity in the transfer and vaporization tubular loop.

* * * * *